United States Patent Office 3,646,089
Patented Feb. 29, 1972

3,646,089
PROCESS FOR PRODUCING ORGANOSILICON COMPOUNDS WITH ISOTHIOCYANATE SUBSTITUENT BONDED THROUGH DIVALENT BRIDGE
Abe Berger, Schenectady, N.Y., assignor to General Electric Company
No Drawing. Filed Jan. 31, 1969, Ser. No. 796,647
Int. Cl. C07f 7/02
U.S. Cl. 260—448.2 E   8 Claims

ABSTRACT OF THE DISCLOSURE

A process for forming organosilicon compounds with an isothiocyanate group bonded to the silicon atom through an alkylene bridge or alkylene bridge having surfur, oxygen, or nitrogen linkages by reacting the corresponding aminoalkyl-substituted organosilicon compound with carbon disulfide and a dialkyl carbodiimide. A new class of organosilicon compounds having an isothiocyanate group bonded to the silicon atom through an alkylene bridge or alkylene bridge having sulfur, oxygen, or nitrogen linkages.

BACKGROUND OF THE INVENTION

Related applications

This application is related to the copending application of Abe Berger, Ser. No. 788,960, filed Jan. 3, 1969.

Prior art

Organosilicon compounds having alkyl isocyanate substituents are known in the art and can be produced, easily by the addition of a chlorosilicon hydride across the olefinic double bond of an olefinic isocyanate, employing platinum catalysis. However, attempts to make the corresponding alkyl isothiocyanates have been unsuccessful, possibly because of the poisoning effect of the sulfur in the isothiocyanate on the platinum catalyst. Organosilicon isothiocyanates have been prepared according to the method described in U.S. Pat. No. 3,178,391—Holtschmidt et al., but, while the isothiocyanate group is bonded to a carbon atom, the thus substituted carbon group is bonded to the silicon atom through an oxysilicon linkage. As is well known, such linkages are not as stable as the silicon-carbon linkage.

Similarly, while dithiocarbamyl-substituted organosilicon compounds have been prepared, where the dithiocarbamyl group is linked to the silicon atom through an alkylene bridge, this process has not proven adaptable to the formation of isothiocyanates. A process for forming these dithiocarbamyl substituted organisolicon compounds is shown in U.S. Pat. No. 2,938,046—Morehouse. Thus, the prior art has not produced stable, isothiocyanate substituted organosilicon compounds where the isothiocyanate is substituted through a bridge which includes a silcon-carbon bond. These materials are extremely useful in the production of particularly advantageous polyurethanes.

BRIEF DESCRIPTION OF THE INVENTION

The present invention involves the formation of an organosilicon compound substituted, through a bridge having a silicon-carbon bond, with an isothiocyanate group. Additionally, this invention involves a method for preparing such compounds by reacting an organosilicon compound, substituted through a bridge with a silicon-carbon bond with an amine group, with carbon disulfide and a dialkyl carbodiimide according to the reaction:

(1)
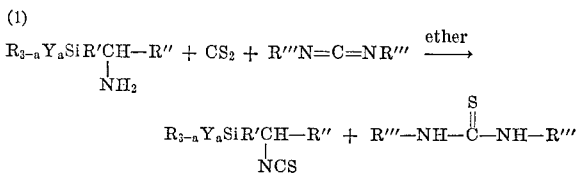

where R is an organic group of not more than 18 carbon atoms selected from the class consisting of alkyl, aryl, aralkyl, alkaryl, cyanoalkyl, cyanoaryl, and dialkylamine radicals; R' is selected from the class consisting of alkylene, oxyalkylene, thioalkylene, and iminoalkylene, where each oxygen, sulfur, or —NH— group is attached to two carbon atoms; R" is selected from the class consisting of alkyl, alkyleneoxyalkyl, alkylene thioalkyl, and alkyleneiminoalkyl, and hydrogen, where each oxygen, sulfur, and —NH— group is attached to two carbon atoms, the total number of carbon atoms in R' and R", combined, being from 0 to 20; Y is a lower ($C_1$—$C_4$) alkoxy group; R''' is selected from the class consisting of alkyl and cycloalkyl radicals of from 1 to 10 carbon atoms; and $a$ is from 0 to 3.

The reaction is carried out in the presence of an ether solvent at temperatures of from 0° to 30° C. Reaction time is generally from 2 to 3 hours after which the thiourea precipitates, indicating completion of the reaction. The product can then be recovered by a flash distillation.

DESCRIPTION OF THE PREFERRED EMBODIMENTS

According to the present invention, an organosilicon compound having an amine substituent attached to the silicon atom through a bridge having a silicon-carbon bond is reacted with carbon disulfide and a dialkyl carbodiimide in the presence of an ether to yield an organosilicon compound having an isothiocyanate group, similarly bridged to the silicon compound through a bridge having a silicon-carbon bond, according to the reaction of Equation 1:

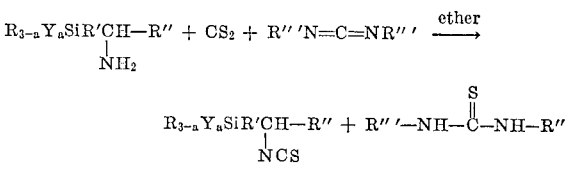

Among the radicals which R represents are alkyl radicals, such as, methyl, ethyl, propyl, butyl, octyl, dodecyl, isopropyl, isobutyl, etc.; cycloalkyl radicals, such as, cyclohexyl, cyclopentyl, cycloheptyl, etc.; aryl radicals, such as, phenyl, biphenyl, naphthyl, benzoylphenyl, paraphenoxyphenyl, tolyl, xylyl, etc.; aralkyl radicals, such as, benzyl, phenethyl, etc.; cyano-substituted radicals, such as, benzyl, phenethyl, etc.; cyano-substituted radicals, such as, cyanomethyl, alpha-cyanoethyl, beta-cyanoethyl, beta-cyanopropyl, gamma-cyanopropyl, cyanophenyl, etc.; and dialkyl amine radicals, such as, dimethyl amine. The preferred substituents represented by R are monovalent alkyl radicals of from 1 to 7 carbon atoms.

R' represents alkylene radicals, such as, methylene, ethylene, propylene, dodecylene, etc.; and alkylene chains with a hetero atom linkage, such as:

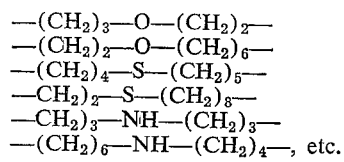

The radicals represented by R″ are monovalent and similar to those represented by R′ and include such alkyl substituents as methyl, ethyl, propyl, butyl, isopropyl, isobutyl, etc.; and monovalent radicals having a hetero atom linkage, such as:

—(CH$_2$)$_2$—O—CH$_3$
—(CH$_2$)—O—C$_2$H$_5$
—(CH$_2$)$_3$—S—CH$_3$
—(CH$_2$)$_4$—S—C$_3$H$_8$
—(CH$_2$)—NH—CH$_3$
—(CH$_2$)$_5$—NH—C$_4$H$_9$, etc.

The alkyl and cycloalkyl radicals represented by R‴ include methyl, ethyl, propyl, decyl, cyclopentyl, cyclohexyl, etc. Y is a lower alkoxy group and includes methoxy, ethoxy, isopropoxy, etc.

The reaction between the organosilicon atom with the amine group linked through a bridge having a silicon-carbon bond, the carbon disulfide, and the dialkyl carbodiimide is carried out in the presence of an ether solvent. The three reactants are generally present in stoichiometric amounts, though there can be a 10% excess, based upon the stoichiometric requirements of either. The carbon disulfide can be present in an excess of as much as 30 mole percent, based upon the stoichiometric.

The solvents employed in the reaction are ethers, including both alkyl and cyclic ethers. Preferably, the reaction is carried out in tetrahydrofuran, though ethyl ether and other ethers can also be employed. The total of the three reactants generally comprises from about 20 to 60%, by weight, of the ether solvent employed. Initially, each of the reactants is soluble in the ether solvent, but following reaction, the thiourea precipitates from the solvent.

The reaction is generally carried out at a temperature of from 0 to 30° C. and the order of addition of the reactants to the reaction mixture is immaterial. The time of reaction is generally from about 2 to 3 hours and then, as previously noted, the thiourea precipitates from the solution. This is an indication that the reaction is complete. The solids are then filtered from the reaction mixture, the solvent stripped, and the reaction mixture fractionated. Additionally, a flash distillation can be employed to purify the organosilicon compound now having the isothiocyanate group linked through a bridge having a silicon-carbon bond.

The products which can be formed according to the present invention include the following:

(CH$_3$)$_2$(CH$_3$O)Si(CH$_2$)$_3$NCS (C$_2$H$_5$)(CH$_3$O)$_2$Si(CH$_2$)$_2$CH—CH$_3$
                                     |
                                    NCS (C$_6$H$_5$)(C$_2$H$_5$O)$_2$Si(CH$_2$)$_2$—O—(CH$_2$)$_2$NCS

[(CH$_3$)$_2$N](CH$_3$)$_2$Si(CH$_2$)$_3$—O—(CH$_2$)$_2$—CH—C$_2$H$_5$
                                                    |
                                                   NCS (C$_6$H$_{11}$)(CH$_3$)$_2$Si(CH$_2$)$_3$—S—CH$_2$CH—CH$_3$
                                          |
                                         NCS (CH$_2$CN)(C$_2$H$_5$)$_2$Si(CH$_2$)$_3$—NH—(CH$_2$)$_4$NCS (C$_2$H$_5$O)$_3$Si—(CH$_2$)$_3$—S—CH$_2$—NCS (CH$_3$O)$_3$Si—(CH$_2$)$_4$—NH—CH$_2$CHCH$_3$
                                    |
                                   NCS

This list should, of course, not be considered exhaustive of the possible compounds to be formed according to the present invention.

The formation of the materials of the present invention, according to the process of the invention, will now be described in greater detail in the following examples. These examples should be considered as illustrative only, and not as limiting in any way the full scope of the invention as covered in the appended claims. All parts in the following examples are by weight.

EXAMPLE 1

Into a reaction vessel were placed 90 parts of dry tetrahydrofuran, 21.1 parts N,N′-dicyclohexylcarbodiimide, and 12.5 parts of carbon disulfide. The reaction mixture was cooled to 10° C. employing an external refrigerant. After the reaction mixture had been reached the desired temperature, a quantity of 14.7 parts of aminopropyldimethylmethoxysilane was added, dropwise, and a mild exotherm was noted. When about one-half of this organosilane had been added, the reaction mixture became cloudy and a precipitate of dicyclohexylthiourea began to precipitate. After completion of the organosilane addition, the reaction mixture was warmed to room temperature and the dicyclohexylthiourea which had formed was removed by filtration. The tetrahydrofuran and excess carbon disulfide were removed by an atmospheric distillation and the remaining reaction product was then fractionated. The desired product distilled at 81° C. and 0.5 mm. pressure and a vapor phase chromatography scan indicated a purity of approximately 98%. An infrared scan, with absorption at 4.52 and 4.7 microns, characteristic of —NCS absorption, was consistent with the structure:

(2)     (CH$_3$)$_2$(CH$_3$O)Si(CH$_2$)$_3$NCS

EXAMPLE 2

A quantity of 21.1 parts N,N′-dicyclohexylcarbodiimide, 12.5 parts carbon disulfide, and 90 parts of dry tetrahydrofuran was placed into a reaction vessel and the mixture was cooled to 10° C. employing an external refrigerant. A quantity of 23.7 parts of aminopropoxypropyltrimethoxysilane was then added to the reaction mixture, dropwise, and a mild exotherm was noted. The temperature of the reaction mixture was maintained at 10° C. ±5° C. by controlling the rate of addition of the organosilane. After the addition was completed, the reaction mixture was allowed to warm to room temperature and after about one-half hour, the mixture became cloudy and a precipitate of dicyclohexylthiourea appeared. The reaction mixture was allowed to remain in the vessel for an additional 3 hours after which the dicyclohexylthiourea was separated by filtration and the tetrahydrofuran removed by atmospheric distillation. The remaining reaction mixture was then fractionated and the product was collected at 125–126° C. at 0.3 mm. as a colorless oil. A vapor phase chromatography scan showed a purity of approximately 99% and the infrared scan was consistent with the structure:

(3)     (CH$_3$O)$_3$Si(CH$_2$)$_3$O(CH$_2$)$_3$NCS

EXAMPLE 3

When the aminopropoxypropyltrimethoxysilane employed in Example 2 is replaced with a corresponding amount of (4)     (C$_6$H$_5$)((C$_2$H$_5$O)$_2$Si(CH$_2$)$_2$NH(CH$_2$)$_2$NH$_2$ the product:

(5)     (C$_6$H$_5$)(C$_2$H$_5$O)$_2$Si(CH$_2$)$_2$NH(CH$_2$)$_2$NCS results.

EXAMPLE 4

When the aminopropoxypropyltrimethoxysilane of Example 2 is replaced with an equivalent quantity of:

(6)     [(CH$_3$)$_2$N](CH$_3$)$_2$Si(CH$_2$)$_2$—S—CH$_2$—CH—CH$_3$
                                                      |
                                                     NH$_2$ the product:

(7)     [(CH$_3$)$_2$N](CH$_3$)$_2$Si(CH$_2$)$_2$—S—CH$_2$—CH—CH$_3$
                                                      |
                                                     NCS results.

EXAMPLE 5

When the aminopropyldimethoxysilane of Example 1 is replaced with an equivalent quantity of:

(8) 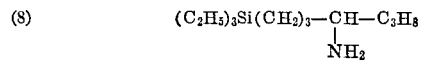

the product:

(9) 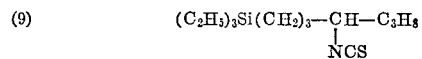

results.

The products produced according to the process of the present invention are valuable starting materials in the preparation of polyurethanes through isocyanate additions. The plastics which are thus produced can be either porous or non-porous and, according to their form, can be used as gears, diaphragms, and as cushioning materials.

I claim:

1. A process for producing an organosilicon compound having an isothiocyanate substituent linked to the silicon atom through a bridge having a silicon-carbon bond comprising reacting an organosilicon compound having the formula:

with carbon disulfide and a dialkyl carbodiimide, in the presence of an ether, where R is selected from the class consisting of alkyl, aryl, aralkyl, alkaryl, cyanoalkyl, cyanoaryl, and dialkylamino groups; R' is a divalent radical selected from the class consisting of alkylene, oxyalkylene, sulfalkylene, and iminoalkylene, where each oxygen, sulfur, and —NH— group is attached to two carbon atoms; R'' is a monovalent group selected from the class consisting of alkyl, alkyleneoxyalkyl, alkylenesulfalkyl, alkyleneiminoalkyl, and hydrogen, where each oxygen, sulfur, and —NH— group is attached to two carbon atoms, the total number of carbon atoms in R' and R'', combined, being from 0 to 20; Y is a lower alkoxy group; and $a$ is from 0 to 3.

2. The process of claim 1 wherein R' is an alkylene group.

3. The process of claim 1 wherein R' is an oxyalkylene group.

4. The process of claim 1 wherein R' is a sulfalkylene group.

5. The process of claim 1 wherein R' is an iminoalkylene group.

6. The process of claim 1 wherein the dialkyl carbodiimide is N,N'-dicyclohexylcarbodiimide.

7. A process for producing an organosilicon compound of formula:

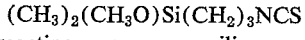

comprising reacting an organosilicon compound of formula:

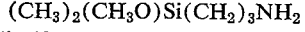

with carbon disulfide and dicyclohexylcarbodiimide, in the presence of tetrahydrofuran.

8. The process for forming an organosilicon compound of formula:

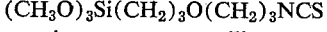

comprising reacting an organosilicon compound of formula:

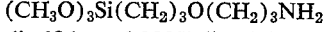

with carbon disulfide and N,N'-dicyclohexylcarbodiimide in the presence of tetrahydrofuran.

References Cited

UNITED STATES PATENTS

| | | | |
|---|---|---|---|
| 2,762,826 | 9/1956 | Noll | 260—448.2 |
| 3,170,891 | 2/1965 | Speier | 260—448.2 X |
| 3,178,391 | 4/1965 | Holtschmidt et al. | 260—448.2 X |

JAMES E. POER, Primary Examiner

W. W. BELLAMY, Assistant Examiner

U.S. Cl. X.R.

260—448.2 N, 448.8 R